(12) United States Patent
Hess et al.

(10) Patent No.: US 6,447,006 B1
(45) Date of Patent: Sep. 10, 2002

(54) INFLATABLE CURTAIN CUSHION VENT

(75) Inventors: Travis Hess, Ogden, UT (US); Davin Saderholm, Brea, CA (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/677,621

(22) Filed: Oct. 3, 2000

(51) Int. Cl.$^7$ .............................................. B60R 21/30
(52) U.S. Cl. ..................... 280/739; 280/743.1; 280/742
(58) Field of Search .......................... 280/743.1, 430.2, 280/749, 739

(56) References Cited

U.S. PATENT DOCUMENTS

| | | | |
|---|---|---|---|
| 4,805,930 A | | 2/1989 | Takarda |
| 5,280,952 A | * | 1/1994 | Hirabayashi et al. ........ 280/739 |
| 5,492,362 A | * | 2/1996 | Lehman et al. ............. 280/739 |
| 5,524,926 A | * | 6/1996 | Hira et al. ................ 270/743.1 |
| 5,536,038 A | | 7/1996 | Bollaert |
| 5,660,414 A | | 8/1997 | Karlow |
| 5,669,628 A | * | 9/1997 | Kaufmann et al. .......... 280/739 |
| 5,692,777 A | * | 12/1997 | Tochacek et al. ......... 280/743.1 |
| 5,704,639 A | | 1/1998 | Cundill |
| 5,725,244 A | | 3/1998 | Cundill |
| 5,755,457 A | | 5/1998 | Specht |
| 5,788,270 A | | 8/1998 | Haland |
| 5,826,905 A | * | 10/1998 | Tochacek et al. ......... 280/743.1 |
| 5,833,265 A | * | 11/1998 | Seymour ................. 280/743.1 |
| 5,839,755 A | * | 11/1998 | Turnbull ..................... 280/739 |
| 5,865,462 A | | 2/1999 | Robins |
| 5,865,464 A | * | 2/1999 | Kanuma et al. ......... 280/743.1 |
| 5,918,901 A | | 7/1999 | Johnson |
| 6,010,149 A | | 1/2000 | Riedel |
| 6,062,143 A | | 5/2000 | Grace |
| 6,099,029 A | | 8/2000 | Haland |
| 6,123,360 A | | 9/2000 | Amin |

* cited by examiner

Primary Examiner—Paul N. Dickson
Assistant Examiner—Paul Royal, Jr.
(74) Attorney, Agent, or Firm—Sally J. Brown; James D. Erickson

(57) ABSTRACT

A venting arrangement for an inflatable curtain cushion is disclosed. The inflatable curtain cushion includes a pair of fabric layers that are themselves gas permeable. The fabric layers have an impermeable coating on the interior surface of fabric layers. One or more vents are provided by bonding a portion of the fabric layers together at the impermeable coating. Separation of the bonded fabric layers causes delamination of the coating from one of the fabric layers. Exposure of the underlying permeable fabric allows venting of inflation gas. The bonded fabric layers separate when gas pressure within the inflatable curtain cushion exceeds a threshold pressure. The number and size of the vents can vary depending upon the permeability of the underlying fabric layer and the desired deflation rate.

23 Claims, 5 Drawing Sheets

INFLATABLE CURTAIN CUSHION VENT

BACKGROUND OF THE INVENTION

1. Field of the Invention

This invention relates to an air-bag arrangement in a car, and more particularly relates to a vent for use in an inflatable curtain cushion arrangement.

2. Technical Background

It is known to provide air-bags in motor vehicles, such as motor cars, which air-bags are adapted to inflate in the event of an accident to provide protection for an occupant of the vehicle. Certain air-bag devices are intended to provide protection in the case of a side impact. Such air-bags are designed to prevent the head of a vehicle occupant from hitting a side window and also to prevent the head of the occupant from emerging through the window opening if the window should be broken or in the lowered position. The air-bag also protects the occupant in the event of vehicle rollover.

Side impact air-bags should be sufficiently rigid to retain the occupant's head in the vehicle when the window is broken or open. A particular problem arises in ensuring that a lower edge of such an air-bag is sufficiently rigid to prevent the air-bag being pushed out through a window during an accident. Side impact air-bags are usually only a few inches thick when deployed. With only a few inches available to protect vehicle occupants, they are generally more rigid than front-impact air-bags.

Side impact air-bags often remain inflated for a longer period of time than front-impact air bags to provide vehicle occupant protection for longer-duration events, like vehicle rollovers. In contrast, front-impact air bags typically include large vents that allow the inflation gas to escape immediately, even during inflation. Deflation of front-impact air-bags begins immediately after inflation. Thus, front-impact air-bags have immediate venting, while side-impact air-bags require slow or delayed venting. A fully sealed side impact air bag inflates rapidly, but it deflates very slowly, if at all. Fully sealed side impact air bags are not preferred because deflation should occur to facilitate removal of the vehicle occupant(s).

It will be appreciated that there is a need in the art for a vent for use in a sealed inflatable curtain cushion which provides appropriate venting and deflation of the curtain cushion after the inflation event.

BRIEF SUMMARY OF THE INVENTION

The present invention is directed to a venting arrangement for an inflatable curtain cushion. The inflatable curtain cushion is typically connected to a gas generator capable of inflating an inflatable element that forms the curtain cushion. The inflatable element includes first and second fabric layers. Selected parts of the first and second fabric layers are interconnected to define a plurality of cells that are inflated with gas from the gas generator. The first and second fabric layers are themselves gas permeable, but to permit efficient inflation, the fabric layers are preferably coated with a substantially impermeable coating. In a preferred embodiment, the impermeable coating is on the interior surface of fabric layers. Currently preferred coating materials include, but are not limited to, urethanes and silicone/urethanes. Persons skilled in the art will appreciate that other impermeable coatings can be used.

One or more vents are provided in the inflatable element. The vents are defined by a portion of the first and second fabric layers bonded together at the impermeable coating. Because the fabrication bonding to form cells occurs within the interior of the inflatable element, and because the impermeable coating is on the interior of the inflatable element, the vents are formed at points where the impermeable coatings of fabric layers are bonded together. Separation of the bonded first and second fabric layers causes removal or delamination of the coating from one of the fabric layers. Exposure of the underlying uncoated, permeable fabric allows venting of inflation gas. The bonded first and second fabric layers separate when gas pressure within the inflatable element exceeds a threshold pressure.

Various types of fabric bonding can be used to bond the first and second layers together. One currently preferred fabric bonding method is RF (radio frequency) bonding. RF bonding of fabric is well known to persons skilled in the art. For example, inflatable airplane slides, inflatable life jackets, and tents commonly utilize RF bonding of fabric. Other fabric bonding methods include conventional chemical bonding using adhesives and glues.

Regardless of the bonding method used, it is important that the bond between the coating material be stronger than the bond between the coating material and the fabric so that delamination of the coating material from the fabric will occur.

The cells that are inflated with gas from the gas generator are preferably configured to be in gas flow communication with one another. They can be immediately adjacent each other or they can be spaced apart with respect to one another.

In operation, the vent area of exposed, uncoated fabric is preferably in the range from about 20 mm$^2$ to 100 mm$^2$, although this area can vary depending upon the number of vents used. For instance, if only one vent is used, then a larger vent area would be required. But if many vents are used, then each vent can have a smaller vent area. The number and size of vents used can also vary depending upon the permeability of the underlying fabric.

The inflatable element is preferably configured to withstand initial gas inflation pressure within the inflatable element from 100 to 150 KPa. This initial inflation occurs upon side impact or collision. This pressure is typically achieved during a 50 millisecond inflation period. Thereafter, the curtain cushion should maintain an inflation pressure from about 50 to 65 KPa for the next 5 to 10 seconds to protect vehicle occupants from secondary collisions and rollovers. Gas pressure within the inflatable element exceeding about 65 KPa causes separation of the bonded first and second fabric layers at the vents.

It will be appreciated by those having ordinary skill in the art that the force required to delaminate a small area vent is less than the force required to delaminate a large area vent. Also, the force required to cause "peel" delamination is less than the force to cause "shear" delamination. Thus, the vent area, the number of vents, and the delamination action can be designed to cause venting at a predetermined inflation pressure.

DETAILED DESCRIPTION OF THE INVENTION

The present invention is directed to a venting system for a sealed inflatable curtain cushion. In order that the invention may be more readily understood, and so that further features thereof may be appreciated, the invention will now be described, by way of example, with reference to the accompanying drawings.

Figure 1:
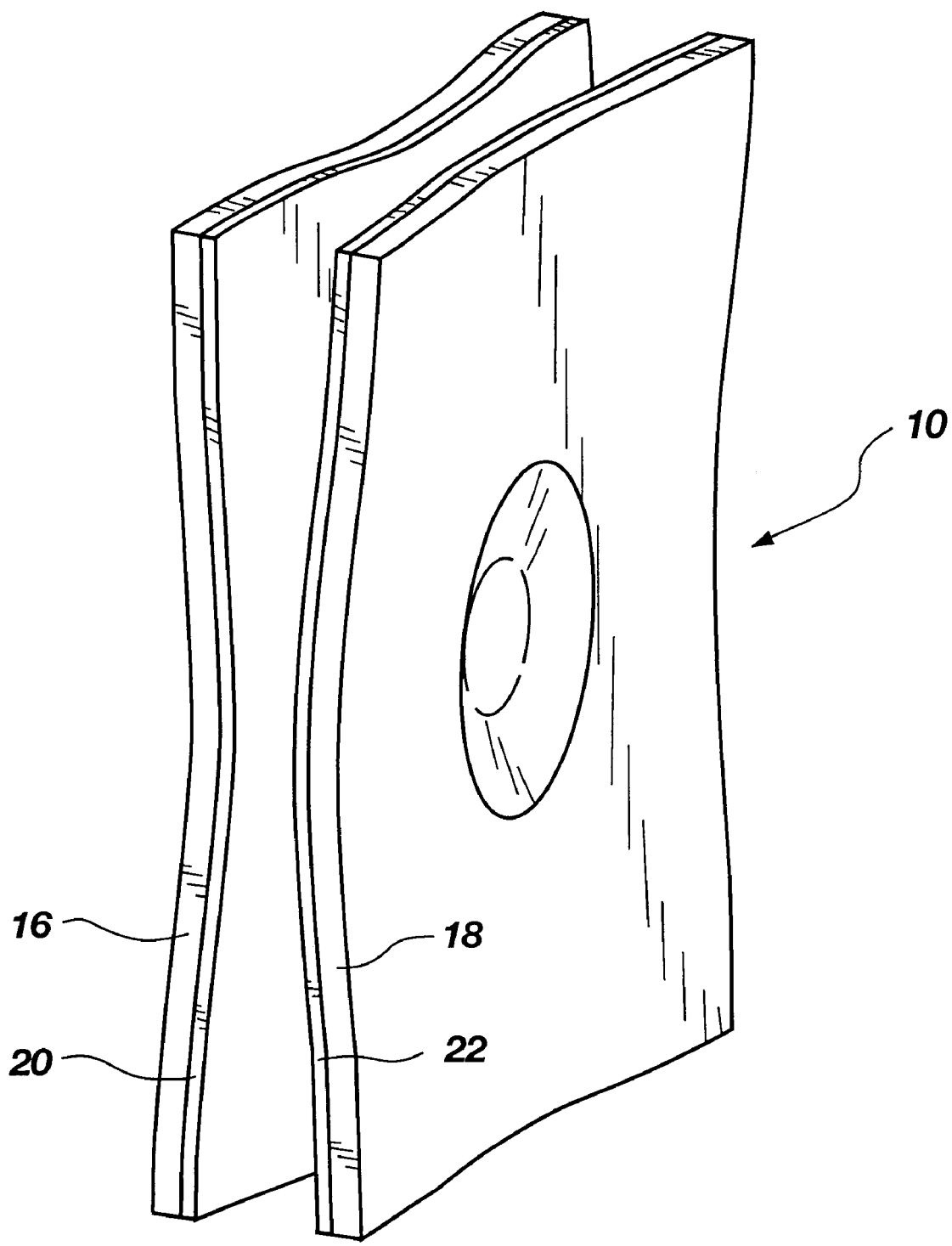
FIG. 1 is a perspective view of a portion of two coated fabric layers bonded together to form a vent.

FIG. 1 shows a perspective view of an inflatable curtain cushion vent 10 within the scope of the present invention. The vent 10 is included in an inflatable element 12, shown generally in FIG. 4, that is configured to be inflated by a gas generator (not shown). The gas generator incorporates, or is associated with, a sensor which senses a side impact and/or a rollover situation to activate the gas generator at an appropriate instant and thereby inflate the inflatable element and form the curtain cushion. The vent 10 is fabricated by bonding together two gas permeable fabric layers 16, 18.

The fabric layers 16, 18 are preferably constructed of woven polymeric yarn fibers, such as nylon or polyester. Nylon 6 and nylon 6–6 are examples of preferred yarn materials. Other conventional yarns can be used in the fabric layer, typically having a denier ranging from about 210 to 630. The weave density will vary depending upon the desired fabric permeability and the yarn denier. For a typical 420 denier yarn, the weave density will range from 46×46 yarns per inch to 53×53 yarns per inch.

Fabric layers 16, 18 are preferably coated with an impermeable coating 20, 22, respectively. As shown in the figures, the impermeable coating 20, 22 is preferably on the interior surface of fabric layers 16, 18. Currently preferred coating materials include, but are not limited to, urethanes and silicone/urethanes. Other known and novel fabric coating materials can be used.

Figure 2:
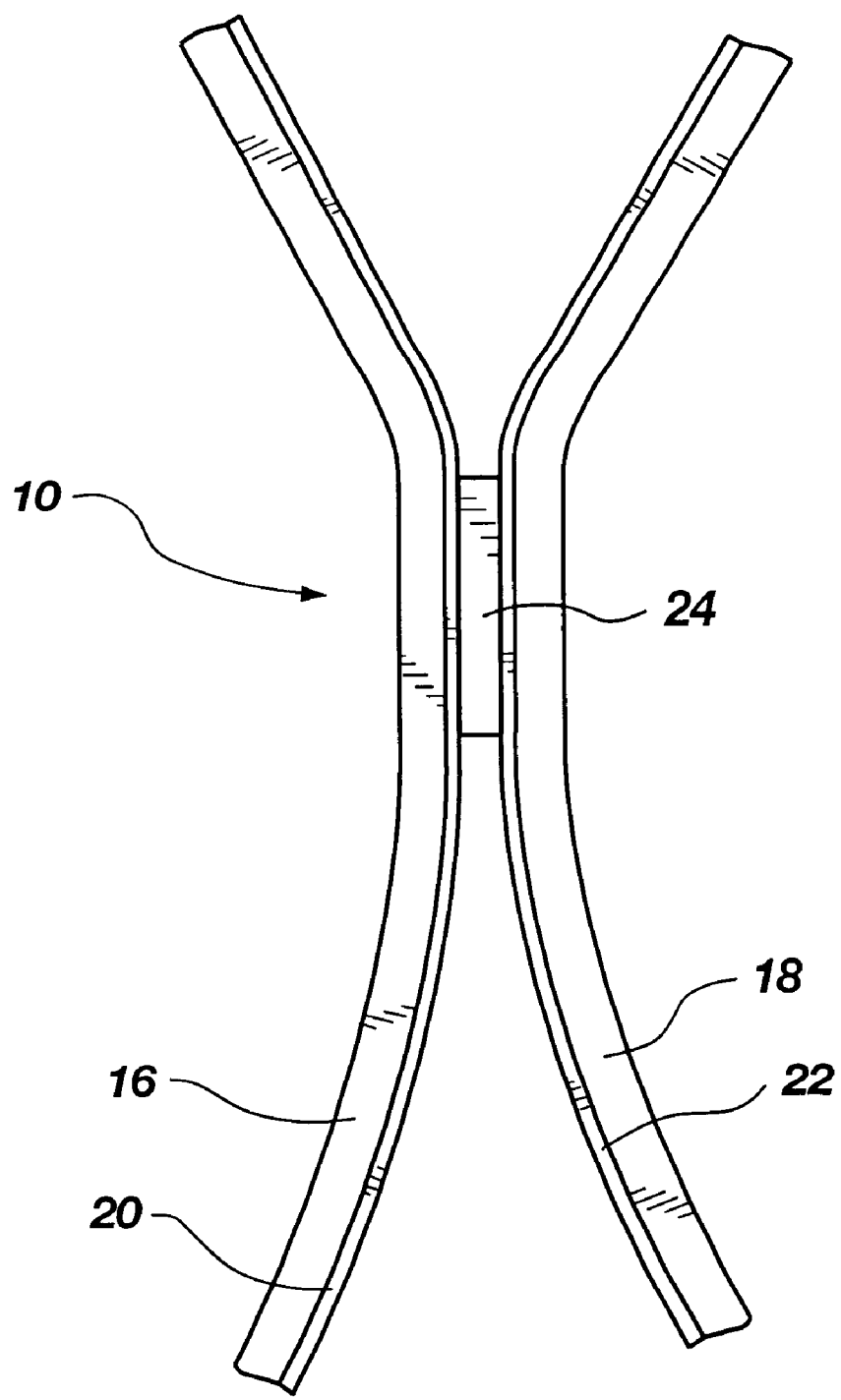
FIG. 2 is an enlarged cross-sectional view of vent illustrated in FIG. 1.

The vents 10 are defined by a portion of the fabric layers 16, 18 bonded together at the impermeable coating 20, 22 as shown in FIG. 2. Bond 24 can result from various types of fabric bonding methods. RF (radio frequency) bonding is one currently preferred fabric bonding method, although other conventional bonding methods such as adhesive, glue, and thermal bonding can be used. To assure preferential delamination of the coating material from the fabric layer, it is important that the bond between the coating material be stronger than the bond between the coating material and the fabric.

Figure 3:
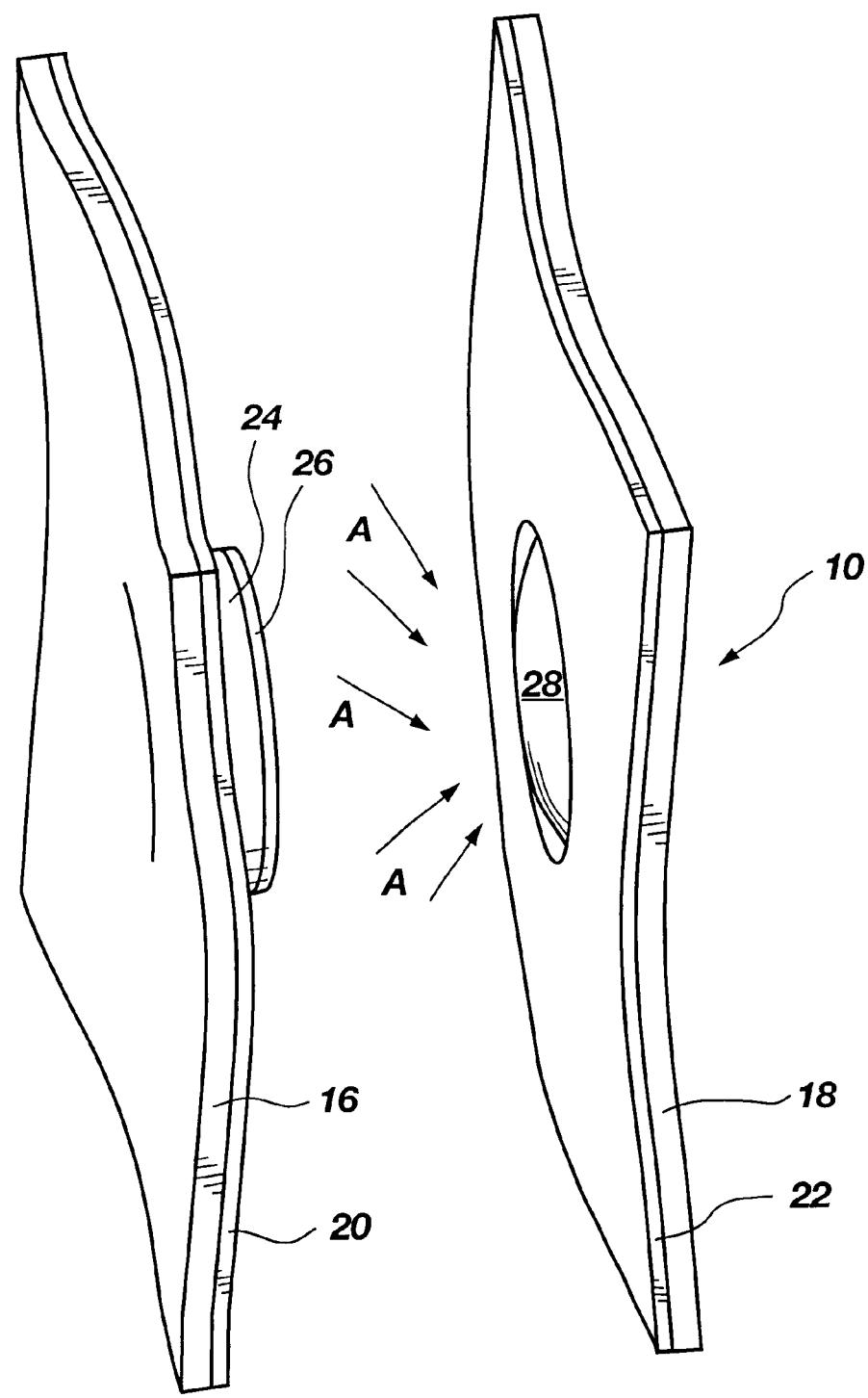
FIG. 3 is a perspective view of the two fabric layers of FIG. 1 that have separated and delaminated the coating to allow gas venting.

FIG. 3 shows a perspective view of an inflatable curtain cushion vent 10 within the scope of the present invention in which the fabric layers 16, 18 have separated. Delamination of a portion of the impermeable coating 26 is shown bonded to the bond 24. Exposure of the underlying fabric layer 28 allows venting of inflation gas, shown by arrows A.

In operation, a side impact or collision causes the gas generator to inflate the inflatable element to a pressure typically from 100 to 150 KPa. This initial inflation pressure is maintained for up to 50 milliseconds. It is currently preferred that one or more vents are rendered operational during this initial inflation to commence deflation. To protect vehicle occupants from secondary collision and rollover, the inflation pressure is preferably from about 50 to 65 KPa at 5 to 10 seconds after initial inflation. Thereafter, deflation should continue such that the curtain cushion can be moved by the vehicle occupant or rescue worker about 30 to 60 seconds after initial inflation.

The bonded fabric layers 16, 18 separate when gas pressure within the inflatable element exceeds a threshold pressure. Gas pressure within the inflatable element exceeding about 65 KPa causes separation of the bonded first and second fabric layers at the vents.

Selected parts of the first and second fabric layers are interconnected to define a plurality of cells that are inflated with gas from the gas generator. The cells that are inflated with gas from the gas generator are preferably configured to be in gas flow communication with one another. They can be immediately adjacent each other or they can be spaced apart with respect to one another.

In operation, the vent area of exposed, uncoated fabric is preferably in the range from about 20 mm$^2$ to 100 mm$^2$, although this area can vary depending upon the number of vents used. For instance, if only one vent is used, then a larger vent area would be required for deflation. But if many vents are used, then each vent can have a smaller vent area.

Figure 4:
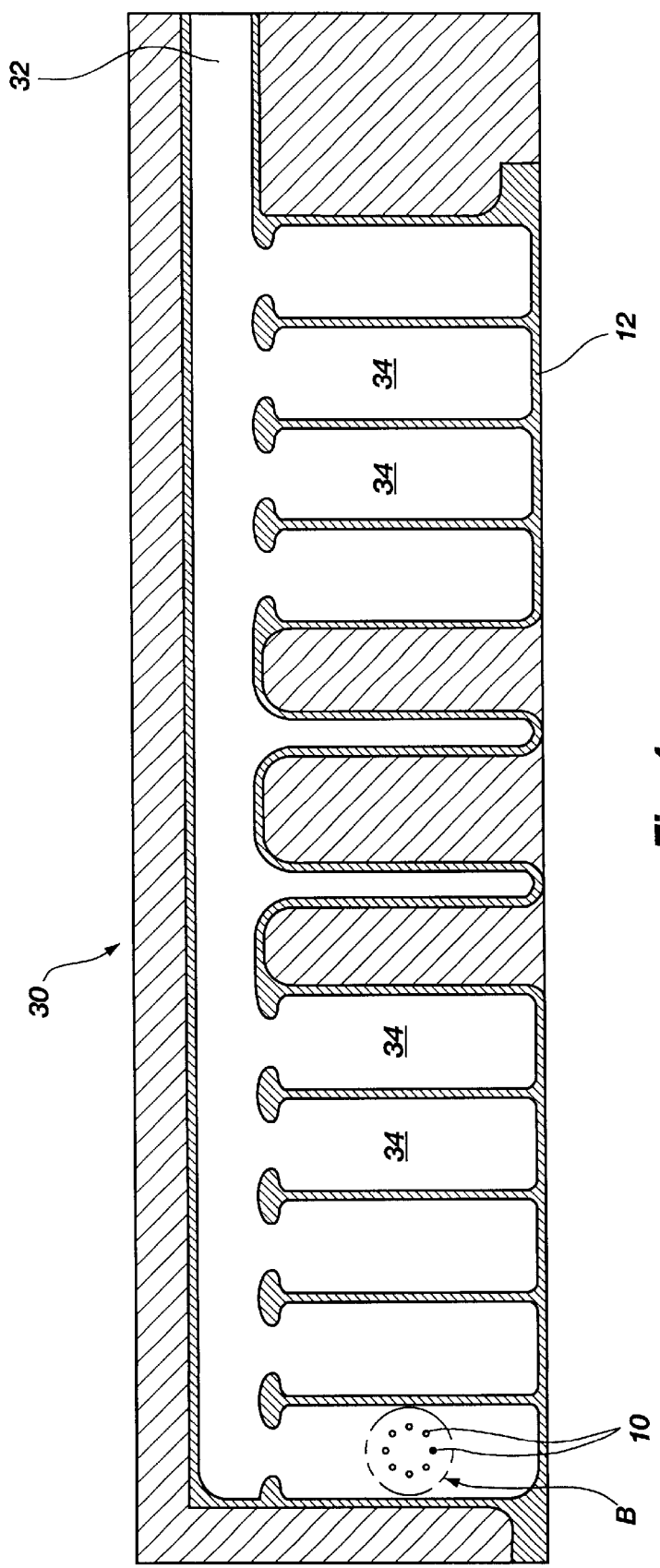
FIG. 4 is a sectional view of a typical inflatable curtain cushion.

FIG. 4 shows a cross-sectional view of a typical inflatable curtain cushion 30. Inflation gas from a gas generator (not shown) enters the inflatable element 12 through gas inlet 32. A plurality of cells 34 are provided in the inflatable element 12 to be inflated with gas from the gas generator. As shown by arrow B, a plurality of vents 10 are provided in the inflatable element. The vents 10 are preferably spaced from the gas inlet 32 so that the inflatable element is substantially inflated before venting begins.

Figure 5A:
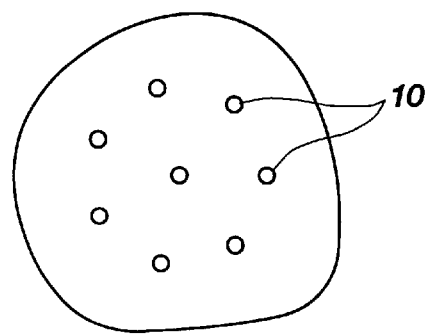
FIGs. 5A–5C are plan views of different multiple vent arrangements.
Figure 5B:
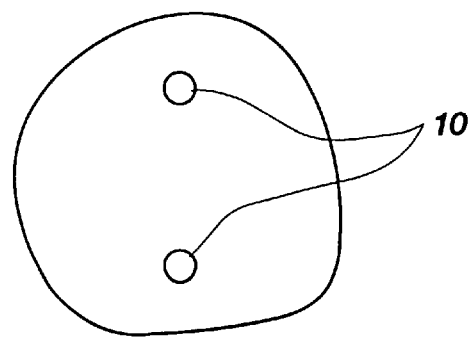
Figure 5C:
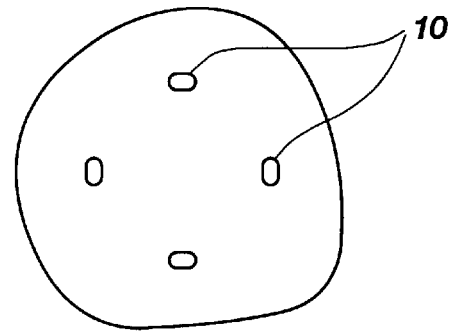

FIGS. 5A–5C show some possible vent spacing configurations. In FIG. 5A eight total vents are shown, with seven vents surrounding a center vent. In FIG. 5B, two vents are shown. In FIG. 5C, four vents are shown. Persons skilled in the art will appreciate that the vent spacing configuration can be varied to achieve the desired venting requirements.

The number and size of the vents is preferably selected to provide deflation as described above. The number and size of vents used can also vary depending upon the permeability of the underlying fabric. If the fabric is very permeable, then the total vent area can be smaller, but if the fabric is less-permeable, then a greater vent area is required to achieve a desired venting rate.

Persons skilled in the art will also appreciate that the venting requirements will vary depending upon the size of the curtain cushion. Large curtain cushions, such as those used in a sport utility vehicle (SUV) or van, will require more venting capacity than smaller curtain cushions, such as those used in small passenger sedans.

It will be appreciated by those having ordinary skill in the art that the force required to delaminate a small area vent is less than the force required to delaminate a large area vent. Also, the force required to cause "peel" delamination is less than the force to cause "shear" delamination. Thus, the vent area, the number of vents, and the delamination action can be designed to cause venting at a predetermined inflation pressure.

An inflatable curtain cushion arrangement embodying the present invention is intended to provide protection for a person sitting in a seat in a motor vehicle. In the case of a side impact or rollover, there is a risk that the head or upper thorax of the driver or occupant will strike the adjacent window in the door, or strike the B-post, or the roof frame. There is also a risk that if, as most commonly happens, the glass in the window should break, the head of the person may be thrown out of the window, especially in the case of rollover. A similar problem will be experienced by a rear seat passenger.

EXAMPLE 1

This example illustrates a method of calculating the amount of area of exposed fabric for proper "bleed-off" to reduce the inflatable curtain (IC) internal pressure from an operating pressure (50 to 65 KPa) to a pressure required to allow for vehicle egress (0 to 10 KPa).

The first step is to calculate the "bleed-off" rate ($R_b$) required:

$$R_b = P_i/t_b$$

wherein $R_b$ is the "bleed-off" rate (KPa/sec), $P_i$ is the IC pressure prior to "bleed-off" (typically 50–65 KPa), and $t_b$ is the time to bleed off pressure (typically 30–60 seconds).

Next, using the ideal gas law, convert $R_b$ in KPa/sec to $R_{b2}$ in gm/sec.

$$R_{b2} = (MRT)/Vt_b$$

wherein M=(number of moles of gas inflator)×(mass molecular weight), R is the gas constant, T is the absolute temperature of the gas (assume 295° K., approximately 22° C. (room temperature)), and V is the volume of the IC. Assume that no gas exiting the inflator leaks from the cushion prior to 5 seconds.

The third step involves determining the fabric permeability, k, in gm/sec·m². This information can be found in fabric handbooks or determined by experimentation using standard fabric permeability test methods.

The fourth step calculates the required area of exposed fabric for proper "bleed-off":

$$A_{flow} = R_{b2}(gm/sec)/k(gm/sec \cdot m^2)$$

Knowing $A_{flow}$, one can determine the number and configuration of vents required.

It will be appreciated that the present invention provides a vent for use in a sealed inflatable curtain cushion which provides appropriate venting and deflation of the curtain cushion after the inflation event.

The present invention may be embodied in other specific forms without departing from its essential characteristics. The described embodiments are to be considered in all respects only as illustrative and not restrictive. The scope of the invention is, therefore, indicated by the appended claims rather than by the foregoing description.

What is claimed is:

1. An inflatable curtain cushion, at least a part of which is adapted to be inflated, the inflatable curtain cushion comprising:
    a first fabric layer defining a front part thereof;
    a second fabric layer defining a back part thereof, selected parts of the first fabric layer and second fabric layer being interconnected to define a plurality of cells configured to be inflated with gas from a gas generator, wherein said first and second fabric layers comprise a substantially impermeable coating disposed on an interior surface of said fabric layers; and
    one or more vents defined by a portion of the first and second fabric layers bonded together, wherein separation of the bonded first and second fabric layers causes removal of the coating from one of the fabric layers and exposure of uncoated fabric that allows venting of inflation gas.

2. An inflatable curtain cushion according to claim 1, wherein the area of exposed, uncoated fabric is in the range from about 20 mm² to 100 mm².

3. An inflatable curtain cushion according to claim 1, wherein the venting gas flow rate through the exposed, uncoated fabric is sufficient to achieve deflation within a time period ranging from 30 seconds to 60 seconds.

4. An inflatable curtain cushion according to claim 1, wherein the inflatable element is configured to withstand gas pressure within the inflatable element up to about 150 KPa.

5. An inflatable curtain cushion according to claim 1, wherein gas pressure within the inflatable element exceeding about 65 KPa causes separation of the bonded first and second fabric layers at the vents.

6. An inflatable curtain cushion according to claim 1, wherein the coating is selected from the group consisting of urethane and a combination of silicone and urethane.

7. An inflatable curtain cushion comprising:
    a gas generator; and
    an inflatable element connected to the gas generator for being inflated with gas from the gas generator upon activation of the gas generator, the inflatable element being made of fabric comprising:
        a first fabric layer defining a front part thereof;
        a second fabric layer defining a back part thereof, selected parts of the first fabric layer and second fabric layer being interconnected for defining a plurality of cells configured to be inflated with gas from the gas generator, wherein said first and second fabric layers comprise a substantially impermeable coating; and
        one or more vents defined by a portion of the first and second fabric layers bonded together, wherein separation of the bonded first and second fabric layers cause removal of the coating from one of the fabric layers and exposure of uncoated fabric that allows venting of inflation gas.

8. An inflatable curtain cushion according to claim 7, wherein gas pressure within the inflatable element exceeding a threshold pressure causes separation of the bonded first and second fabric layers at the vents.

9. An inflatable curtain cushion according to claim 7, wherein the area of exposed, uncoated fabric is in the range from about 20 mm² to 100 mm².

10. An inflatable curtain cushion according to claim 7, wherein the first and second layers are bonded together at the vents by radio frequency bonding.

11. An inflatable curtain cushion according to claim 7, wherein the first and second layers are bonded together at the vents by chemical bonding.

12. An inflatable curtain cushion according to claim 7, wherein the first and second layers are bonded together at the vents by thermal bonding.

13. An inflatable curtain cushion according to claim 7, wherein the cells are configured to be in gas flow communication with one another.

14. An inflatable curtain cushion according to claim 7, wherein the cells are immediately adjacent each other.

15. An inflatable curtain cushion according to claim 7, wherein the cells are spaced apart with respect to one another.

16. An inflatable curtain cushion, at least a part of which is adapted to be inflated, the inflatable curtain cushion comprising:
    a first fabric layer defining a front part thereof;
    a second fabric layer defining a back part thereof, selected parts of the first fabric layer and second fabric layer being interconnected to define a plurality of cells configured to be inflated with gas from a gas generator, wherein said first and second fabric layers comprise a substantially impermeable coating disposed on an interior surface of said fabric layers; and one or more vents defined by a portion of the first and second fabric layers bonded together, wherein gas pressure within the inflatable element exceeding about 65 KPa causes separation of the bonded first and second fabric layers and removal of the coating from one of the fabric layers, thereby exposing uncoated fabric that allows venting of inflation gas, wherein the area of exposed, uncoated fabric is in the range from about 20 mm$^2$ to 100 mm$^2$.

17. An inflatable curtain cushion according to claim 16, wherein the venting gas flow rate through the exposed, uncoated fabric is sufficient to achieve deflation within a time period ranging from 30 seconds to 60 seconds.

18. An inflatable curtain cushion according to claim 16, wherein the first and second layers are bonded together at the vents by radio frequency bonding.

19. An inflatable curtain cushion according to claim 16, wherein the first and second layers are bonded together at the vents by chemical bonding, adhesion bonding, or thermal bonding.

20. An inflatable curtain cushion according to claim 16, wherein the cells are configured to be in gas flow communication with one another.

21. A vent for an inflatable curtain cushion, the vent comprising:

a portion of a first fabric layer, the first fabric layer having an outer edge;

a portion of a first substantially impermeable coating disposed on an inward surface of the portion of the first fabric layer;

a portion of a second fabric layer, the second fabric layer having an outer edge attached to the outer edge of the first fabric layer to substantially retain inflation gas between the first and second fabric layers; and a portion of a second substantially impermeable coating disposed on an inward surface of the second fabric layer and adhered to the portion of the first substantially impermeable coating with a strength sufficient to induce removal of one of the portions of the substantially impermeable coatings from the associated portion of the first or second fabric layers, thereby permitting inflation gas to flow out of the inflatable curtain cushion through the associated portion of the first or second fabric layers, when the inflation gas reaches a threshold pressure.

22. A method for venting inflation gas from an inflatable curtain cushion comprising a first fabric layer at least partially covered by a first substantially impermeable coating and a second fabric layer at least partially covered by a second substantially impermeable coating, the inflatable curtain cushion comprising a vent defined by a portion of the first and second fabric layers bonded together, the method comprising:

separating the first and second fabric layers of the vent;

withdrawing a portion of the second substantially impermeable coating from a portion of the second fabric layer to expose a portion of the second fabric layer to inflation gas; and permitting inflation gas to flow out of the inflatable curtain cushion through the exposed portion of the second fabric layer.

23. The method of claim 22, wherein withdrawing a portion of the second substantially impermeable coating form a portion of the second fabric layer comprises pulling the portion of the second substantially impermeable coating away from the second fabric layer in a direction substantially perpendicular to the second fabric layer.

* * * * *